United States Patent
Law et al.

(10) Patent No.: US 12,526,572 B2
(45) Date of Patent: Jan. 13, 2026

(54) SMART GLASSES, SYSTEM AND CONTROL METHOD THEREOF

(71) Applicant: SOLOS TECHNOLOGY (SHENZHEN) LIMITED, Guangdong (CN)

(72) Inventors: Kwok Wah Law, Guangdong (CN); Chiu Ming So, Guangdong (CN); Wai Kuen Cheung, Guangdong (CN)

(73) Assignee: SOLOS TECHNOLOGY (SHENZHEN) LIMITED, Shenzhen (CN)

( * ) Notice: Subject to any disclaimer, the term of this patent is extended or adjusted under 35 U.S.C. 154(b) by 199 days.

(21) Appl. No.: 18/418,377

(22) Filed: Jan. 22, 2024

(65) Prior Publication Data
US 2024/0163603 A1 May 16, 2024

Related U.S. Application Data

(63) Continuation of application No. PCT/CN2022/106802, filed on Jul. 20, 2022.

(30) Foreign Application Priority Data

Jul. 22, 2021 (CN) .......................... 202110833422.7

(51) Int. Cl.
H04R 1/32 (2006.01)
(52) U.S. Cl.
CPC ....... *H04R 1/326* (2013.01); *H04R 2201/023* (2013.01); *H04R 2420/07* (2013.01)

(58) Field of Classification Search
CPC ..... H04L 5/0048; H04L 5/0005; G10L 15/22; G10L 21/0208; H04M 1/21; H04R 1/1041; H04R 1/326; H04R 1/406; H04R 2201/023; H04R 2201/107; H04R 2420/07; H04R 25/407; H04R 3/005; H04R 5/0335; H04R 2225/49; H04R 25/00; H04B 17/345; H04B 7/024; H04B 7/0639; H04B 7/06952; H04W 24/10; H04W 36/0005; H04W 36/302; H04W 48/00; H04W 52/243; H04W 52/325; H04W 52/42;
(Continued)

(56) References Cited

U.S. PATENT DOCUMENTS

| | | | |
|---|---|---|---|
| 9,432,768 B1 * | 8/2016 | O'Neill | H04R 3/005 |
| 10,289,205 B1 * | 5/2019 | Sumter | G06F 3/0346 |
| 12,307,053 B2 * | 5/2025 | Hu | G06N 20/00 |

(Continued)

*Primary Examiner* — Lun-See Lao

(57) ABSTRACT

Smart glasses include a frame, temples connected to the frame, at least one sound pickup device provided on at least one of the plurality of temples and a wireless communication module provided in a cavity of any one of the plurality of temples and electrically connected to the at least one sound pickup device. The wireless communication module is configured to control and switch the operation modes of the smart glasses, perform a first beamforming processing on voice data acquired by the at least one sound pickup device in the call mode so that sound beam pickup of the at least one sound pickup device is directed downward, and perform a second beamforming processing on the voice data in the hearing aid mode so that the sound beam pickup of the at least one sound pickup device is directed forward.

33 Claims, 11 Drawing Sheets

(58) Field of Classification Search
CPC ........... H04W 74/002; H04W 74/0833; H04W 76/10; H04W 76/11; H04W 76/27
USPC ..................................... 381/92, 123, 1–3, 74
See application file for complete search history.

(56) References Cited

U.S. PATENT DOCUMENTS

| | | | |
|---|---|---|---|
| 2022/0070585 A1* | 3/2022 | Chen .................... | H04R 1/1041 |
| 2023/0221583 A1* | 7/2023 | Elkenawy .............. | G02C 11/06 |
| | | | 381/124 |
| 2023/0258798 A1* | 8/2023 | Shin ........................ | G01S 11/14 |
| | | | 367/99 |

* cited by examiner

SMART GLASSES, SYSTEM AND CONTROL METHOD THEREOF

CROSS-REFERENCE TO RELATED APPLICATIONS

The present application is a Continuation application of PCT Application No. PCT/CN2022/106802, filed on Jul. 20, 2022, which claims the priority of Chinese Patent Application No. 202110833422.7, titled "Smart Glasses, and Control Method and System Thereof", filed on Jul. 22, 2021, the entire contents of which are hereby incorporated by reference.

TECHNICAL FIELD

Embodiments of the present disclosure relate to the fields of electronic devices and communication technologies, and in particular to smart glasses and control methods and systems thereof.

DESCRIPTION OF THE PRIOR ART

Existing smart glasses usually include all electronic components such as microcontroller and sensors (such as pedometers, heart rate sensors, accelerators, gyroscopes, Global Positioning System (GPS), etc.) on the main body of the glasses. All intelligent functions are completed by using the microcontroller built in the smart glasses to receive sensor data and perform calculations.

In one aspect, because the main body of the glasses is loaded with too many electronic components, these smart glasses are usually heavy, cannot be worn all day, and consume high power. In another aspect, most smart glasses only focus on intelligent functions based on device control, but lack humanized control and cannot provide hearing aid functions. In a further aspect, due to the limited space on the main body of the glasses, the electronic components are very close to each other, which will cause interference with each other. In particular, a loop will be generated between the speaker and the sound pickup device, which can easily lead to echo or howling.

SUMMARY OF THE DISCLOSURE

Embodiments of the present disclosure provide smart glasses and control methods and systems thereof, which are configured to implement telephone call function and hearing aid function based on the same hardware platform of the smart glasses, and can reduce the weight of the smart glasses, reduce power consumption, and reduce manufacturing cost of the smart glasses.

In one aspect, embodiments of the present disclosure provide smart glasses, including: a frame, a plurality of temples, at least one sound pickup device and a wireless communication module.

The temples are connected to the frame, the at least one sound pickup device is provided on at least one of the plurality of temples, and the wireless communication module is provided in a cavity of any one of the plurality of temples and electrically connected to the at least one sound pickup device.

The wireless communication module is configured to control and switch operation modes of the smart glasses, and the operation modes include a call mode and a hearing aid mode.

The wireless communication module is further configured to perform a first beamforming processing on voice data acquired by the at least one sound pickup device in the call mode, so that sound beam pickup of the at least one sound pickup device is directed downward.

The wireless communication module is further configured to perform a second beamforming processing on the voice data in the hearing aid mode, so that the sound beam pickup of the at least one sound pickup device is directed forward.

In another aspect, embodiments of the present disclosure provide a smart glasses control system, including: a smart mobile terminal and smart glasses as provided in the above embodiments.

The smart mobile terminal is configured for data interaction with the smart glasses.

In a further aspect, embodiments of the present disclosure provide a control method of the smart glasses. The smart glasses include: a wireless communication module and a sound pickup device electrically connected to the wireless communication module. The method includes:

controlling and switching an operation mode of the smart glasses to a call mode or a hearing aid mode through the wireless communication module in response to a user's control operation;

obtaining voice data through the sound pickup device;

performing a first beamforming processing on the voice data through the wireless communication module if a current operation mode of the smart glasses is the call mode, so that a sound beam pickup of the sound pickup device is directed downward; and performing a second beamforming processing on the voice data through the wireless communication module if the current operation mode of the smart glasses is the hearing aid mode, so that the sound beam pickup of the sound pickup device is directed forward.

In various embodiments of the present disclosure, the wireless communication module provided on the smart glasses is configured to control and switch the operation modes of the smart glasses. On the one hand, the wireless communication module performs a first beamforming processing on the voice data acquired by the sound pickup device in the call mode, so that the sound beam pickup of the sound pickup device is directed downward. On the other hand, the wireless communication module performs a second beamforming processing on the voice data in the hearing aid mode, so that the sound beam pickup of the sound pickup device is directed forward, thereby implementing the telephone call function and the hearing aid function based on the same hardware platform of the smart glasses, increasing the functions of the smart glasses. In addition, since there is no need to install additional hearing aid device on the smart glasses, the weight of the smart glasses can be reduced, power consumption can be reduced, and the manufacturing cost of the smart glasses can be reduced.

BRIEF DESCRIPTION OF DRAWINGS

In order to explain the embodiments of the present disclosure or the technical solutions in the prior art more apparently, in the following, the drawings accompanied with the embodiments or the prior art will be briefly introduced. Obviously, the drawings in the following description refer to some embodiments of the present disclosure. For those skilled in the art, other drawings can be obtained based on these drawings without any creative effort.

DESCRIPTION OF EMBODIMENTS

In order to make the objects, features and advantages of the embodiments of the present disclosure more apparent, the technical solutions of the embodiments of the present disclosure will be clearly and completely described below in conjunction with the drawings of the embodiments of the present disclosure. Obviously, the described embodiments are part of the embodiments of the present disclosure, but not all of them. Based on the embodiments in the present disclosure, all other embodiments obtained by those skilled in the art without creative efforts fall within the scope of protection of the present disclosure.

Figure 1:
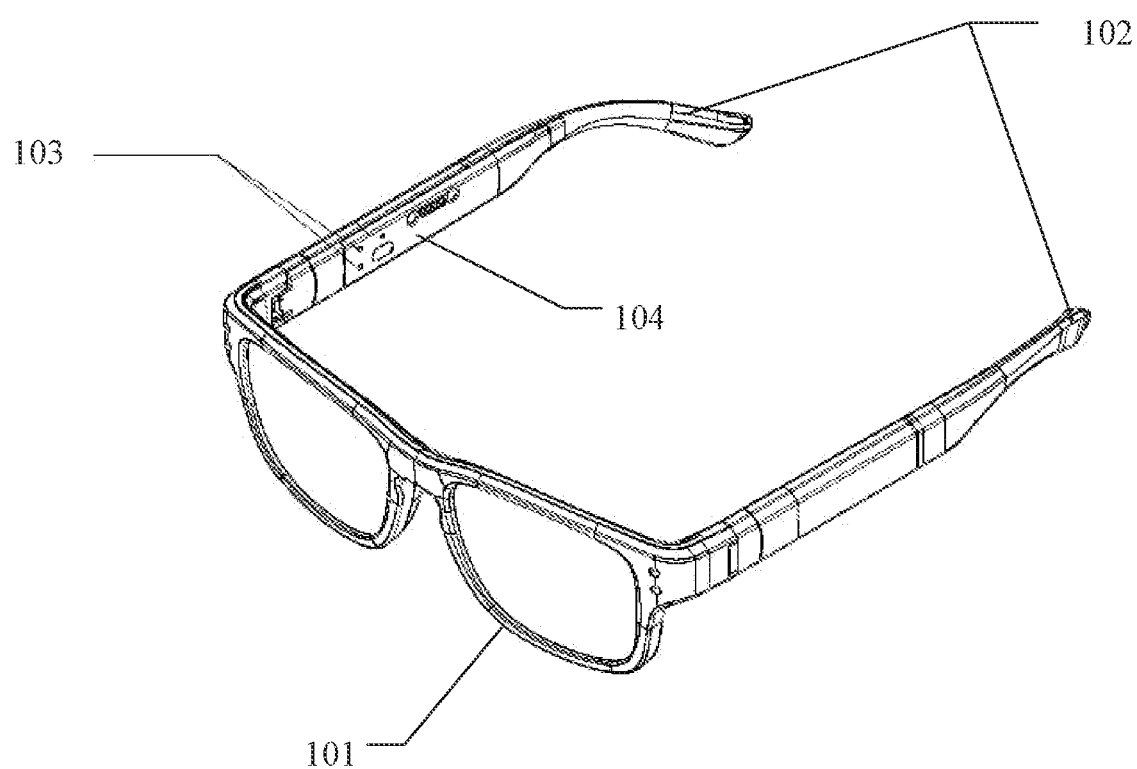
FIG. 1 is a schematic view of smart glasses according to an embodiment of the present disclosure.

Referring to FIG. 1, FIG. 1 is a schematic view of smart glasses according to an embodiment of the present disclosure. For convenience of description, only parts related to the embodiment of the present disclosure are shown in the figure. As shown in FIG. 1, the smart glasses include a frame 101, a plurality of temples 102, at least one sound pickup device 103 (for ease of understanding, only one is shown in the figure), and a wireless communication module 104.

The temples 102 are connected to the frame 101, the at least one sound pickup device 103 is provided on at least one of the plurality of temples 102, and the wireless communication module 104 is provided in a cavity of any one of the plurality of temples 102 and is electrically connected to the at least one sound pickup device 103.

The wireless communication module 104 is configured to control and switch the operation modes of the smart glasses. The operation modes include a call mode and a hearing aid mode (or conversation mode).

The wireless communication module 104 is further configured to perform a first beamforming processing on the voice data acquired by the at least one sound pickup device 103 in the call mode, so that the sound beam pickup of the at least one sound pickup device 103 is directed downward, in which case, the source of the voice data may be the wearer of the smart glasses.

The wireless communication module 104 is further configured to perform a second beamforming processing on the voice data acquired by the at least one sound pickup device 103 in the hearing aid mode, so that the sound beam pickup of the at least one sound pickup device 103 is directed forward, in which case, the source of the voice data may be the conversation partner of the wearer of the smart glasses.

In this embodiment, the wireless communication module is configured to control and switch the operation modes of the smart glasses, on the one hand, to perform the first beamforming processing on the voice data acquired by the sound pickup device in the call mode, so that the sound beam pickup of the sound pickup device is directed downward, on the other hand, to perform the second beamforming processing on the voice data in the hearing aid mode, so that the sound beam pickup of the sound pickup device is directed forward, thereby implementing the telephone call function and the hearing aid function based on the same hardware platform of the smart glasses, increasing the functions of the smart glasses. In addition, since there is no need to install additional hearing aid device on the smart glasses, the weight of the smart glasses can be reduced, power consumption can be reduced, and the manufacturing cost of the smart glasses can be reduced.

Figure 2:
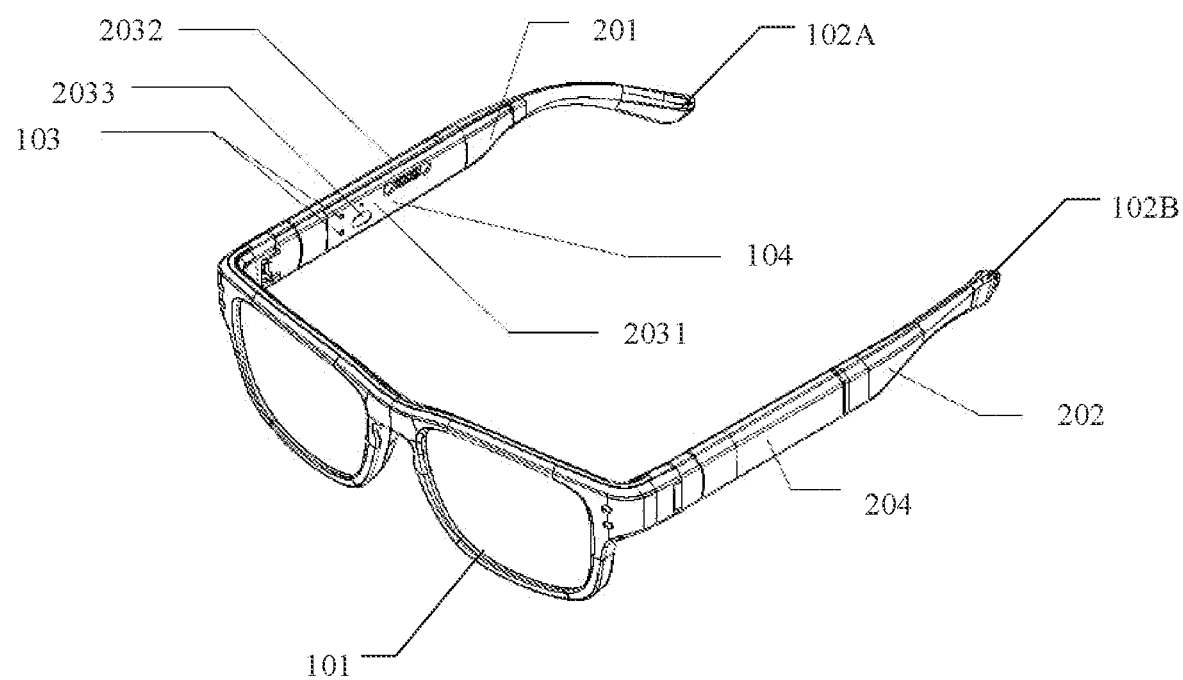
FIG. 2 is a schematic view of the external structure of smart glasses according to another embodiment of the present disclosure.
Figure 3:
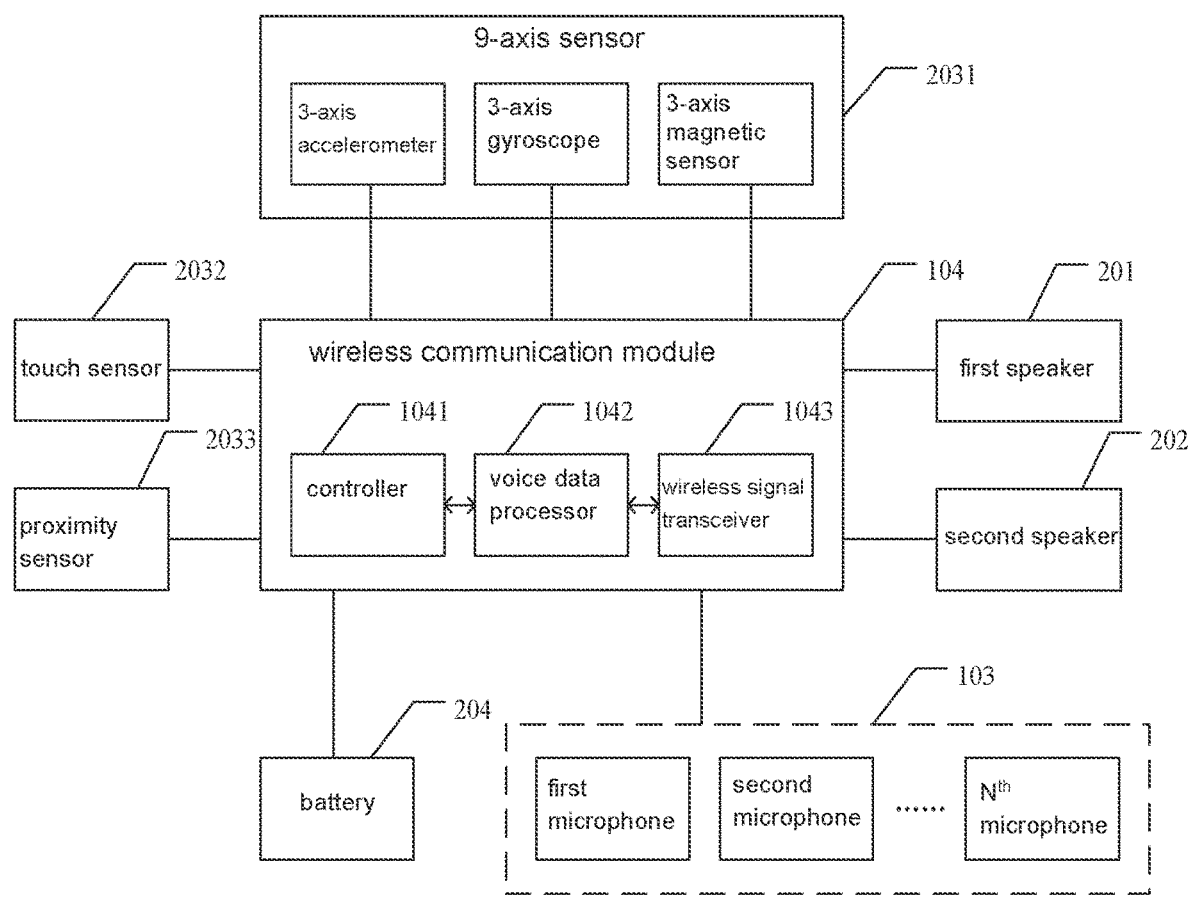
FIG. 3 is a schematic view of the internal structure of the smart glasses according to the embodiment shown in FIG. 2.

Referring to FIGS. 2 and 3, FIG. 2 is a schematic view showing the external structure of smart glasses according to another embodiment of the present disclosure, and FIG. 3 is a schematic view showing the internal structure of the smart glasses shown in FIG. 2. As shown in FIGS. 2 and 3, this embodiment is different from the embodiment shown in FIG. 1 in the following.

The wireless communication module 104 is further configured to receive the sound pickup direction control command sent by the smart mobile terminal. The wireless communication module 104 is further configured to perform the above-mentioned second beamforming processing on the voice data in the hearing aid mode when the direction indicated by the sound pickup direction control command is forward, so that the sound beam pickup of the at least one sound pickup device 103 is directed forward. The wireless communication module 104 is further configured to not perform the second beamforming processing on the voice data in the hearing aid mode when the direction indicated by the sound pickup direction control command is omnidirectional, so that the sound beam pickup of the at least one sound pickup device 103 is directed omnidirectionally. Here, the sound beam pickup being directed omnidirectionally means 360° omnidirectional sound pickup.

Optionally, the plurality of temples 102 includes a first temple 102A and a second temple 102B. The front end of the first temple 102A and the front end of the second temple 102B are respectively connected to two sides of the frame 101. The at least one sound pickup device 103 is installed at the front end of the first temple 102A.

Optionally, the smart glasses further include a first speaker 201 and a second speaker 202 electrically connected to the wireless communication module 104. The first speaker 201 and the second speaker 202 are configured to output voice data or music data. The voice data includes: the voice data acquired by the sound pickup device 103 after being processed by the wireless communication module 104, and the call voice data sent by the smart mobile terminal and received by the wireless communication module 104. The music data includes: music data sent by the smart mobile terminal and received by the wireless communication module 104.

The first speaker 201 is installed on the first temple 102A, and the output of the first speaker 201 is located at the rear end of the first temple 102A.

The second speaker 202 is installed on the second temple 102B, and the output of the second speaker 202 is located at the rear end of the second temple 102B.

As the sound pickup device is installed at the front end of the temple, and the output of each speaker is installed at the rear end of the temple, there is a sufficient distance between the sound pickup device and the output of each speaker, thereby effectively lowering the risk of generation of a loop between the sound pickup device and the speaker and thus reducing echo and howling during use.

In addition, after the user wears the smart glasses, the rear ends of the temples are closest to the user's ears. Installing the speaker output at the rear end of the temple allows the speaker output to be closest to the user's ear, thereby improving the efficiency of sound output.

The first speaker 201 and the second speaker 202 are preferably mono speakers. Mono speakers respectively installed on the temples can produce stereo sound together.

Optionally, as shown in FIG. 3, the wireless communication module 104 includes a controller 1041, a voice data processor 1042, and a wireless signal transceiver 1043. The controller 1041, the voice data processor 1042 and the wireless signal transceiver 1043 can be connected through a bus.

The controller 1041 is configured to control and switch the operation modes of the smart glasses. The controller 1041 is preferably an MCU (Microcontroller Unit).

The voice data processor 1042 is used for processing voice data. The voice data processor 1042 is preferably a DSP (Digital Signal Processor) or an integrated circuit for voice data processing. The integrated circuit for voice data processing is a commonly used circuit, which is not specifically limited here regarding its structure.

The wireless signal transceiver 1043 is used for data interaction with the smart mobile terminal. Optionally, the wireless communication module 104 uses at least one of Bluetooth protocol, WiFi (Wireless Fidelity) protocol, NFC (Near Field Communication) protocol, ZigBee protocol, DLNA (Digital Living Network Alliance) protocol, UWB (Ultra Wideband) protocol, RFID (Radio Frequency Identification) protocol and Cellular Mobile Communication protocol as a communication protocol for data interaction with the smart mobile terminal. The Bluetooth protocol is preferred.

Optionally, the voice data processor 1042 includes a voice equalizer. The wireless signal transceiver 1043 is further configured to receive the volume adjustment control command sent by the smart mobile terminal and send the same to the voice data processor 1042. The voice data processor 1042 is further configured to use the voice equalizer to adjust the sound data to be output to the sound data with the frequency band and volume directed by the volume adjustment control command, and send the adjusted sound data to the speaker directed by the volume adjustment control command. The frequency band directed by the volume adjustment control command can be low frequency, medium frequency or high frequency. Volume adjustment can be to increase or decrease the volume.

Further, the voice data processor 1042 is configured to perform voice equalization processing (using the voice equalizer) and output volume processing on the data of the downlink channel in the call mode, and use preset acoustic echo cancellation algorithm, beamforming algorithm and noise cancellation algorithm to perform echo cancellation processing, the first beamforming processing and noise cancellation processing on the data of the uplink channel.

Specifically, the voice data processor 1042 is further configured to perform voice equalization processing and output volume control processing on the call voice data (i.e., the data of the downlink channel) received by the wireless signal transceiver 1043 from the smart mobile terminal in the call mode, and send the call voice data after the output volume control processing to the first speaker 201 and the second speaker 202 for output. The voice data processor 1042 is further configured to use the call voice data after the output volume control processing as a reference signal, perform echo cancellation processing on the voice data acquired by the sound pickup device 103 (i.e., the data of the uplink channel), perform first beamforming processing and noise cancellation processing on the voice data after the echo cancellation processing, and send the signal after the noise cancellation processing to the smart mobile terminal through the wireless signal transceiver 1043.

Further, the voice data processor 1042 is further configured to use preset feedback cancellation algorithm, beamforming algorithm, noise cancellation algorithm, voice equalizer algorithm and user talking detection algorithm to perform feedback cancellation processing, second beamforming processing, noise cancellation processing, voice equalization processing and user talking detection processing on the voice data in the hearing aid mode, and send the voice data after voice equalization processing to the first speaker 201 and the second speaker 202 for output. Also, the voice data after voice equalization processing is used as reference data for the above-mentioned feedback cancellation processing during the processing.

Optionally, the smart glasses further include at least one sensor (not shown in the figure) electrically connected to the wireless communication module 104.

The at least one sensor is installed on the inside and/or outside of the first temple 102A and/or the second temple 102B.

Specifically, the at least one sensor includes at least one of a touch sensor, a proximity sensor, an accelerometer, a gyroscope, a magnetic sensor, and an inertial measurement unit.

Optional, the inertial measurement unit is a 9-axis sensor. The 9-axis sensor is configured to collect the user's motion data and send the same to the smart mobile terminal through the wireless communication module 104 for data processing.

Preferably, as shown in FIG. 3, the at least one sensor includes: a 9-axis sensor 2031, at least one touch sensor 2032 and at least one proximity sensor 2033.

The at least one touch sensor 2032 is installed on the outside of the first temple 102A and/or the second temple 102B.

Optionally, the at least one touch sensor is configured to detect the user's first control operation and send the detected data of the first control operation to the controller 1041, wherein the first control operation is intended to adjust the volume. The controller 1041 is further configured to control and adjust the volume of the sound output by the smart glasses in response to the first control operation according to the data of the first control operation.

The first control operation includes a control operation for turning up the volume and a control operation for turning down the volume. The control operation for turning up the volume corresponds to the action of the user's finger sweeping toward the ear on the touch sensor, and the control operation for turning down the volume corresponds to the action of the user's finger sweeping toward the frame on the touch sensor (i.e. away from the ear).

Optionally, the at least one touch sensor is further configured to detect the user's second control operation, and send the detected data of the second control operation to the controller 1041. The controller 1041 is further configured to control and switch the operation modes of the smart glasses in response to the second control operation according to the data of the second control operation.

The second control operation preferably corresponds to the user's action of clicking or long-pressing the touch sensor. For example, the user can switch the operation mode of the smart glasses to the call mode or hearing aid mode by long-pressing the touch sensor for more than 3 seconds.

Optionally, the at least one proximity sensor is installed on the inside of the first temple 102A and/or the second temple 102B for detecting whether the user wears or takes off the smart glasses and obtaining the length of time the user has not worn the smart glasses, and sending the detected result to the controller 1041. The controller 1041 is configured to, based on the detected result, play music data when the proximity sensor detects that the user is wearing the smart glasses, stop playing the music data when the proximity sensor detects that the user has taken off the smart glasses, and perform shutdown operation when the proximity sensor detects that the user has not worn the smart glasses for more than a preset period of time.

The number of each of the above sensors is preferably one to reduce the overall weight of the smart glasses. However, in practice, the number of each of the above sensors is not limited to one as required. For example, in order to improve the accuracy of the detected result, the two temples can be each provided with a proximity sensor.

Optionally, the controller 1041 is further configured to send the data acquired by the sensor to the smart mobile terminal through the wireless signal transceiver 1043.

Optionally, the sound pickup device 103 is a microphone array, and the microphone array includes at least two microphones.

Specifically, the microphone array includes a first microphone M1, a second microphone M2, and a third microphone M3.

The distance between the third microphone M3 and the first microphone M1 is equal to the distance between the third microphone M3 and the second microphone M2. Alternatively, as shown in FIG. 4, the distance d1 between the first microphone M1 and the second microphone M2 is equal to the distance d2 between the third microphone M3 and the midpoint of the line connecting the first microphone M1 and the second microphone M2.

Figure 4:
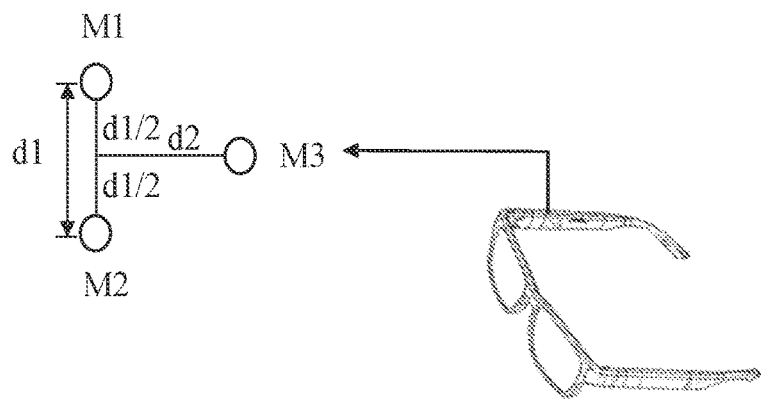
FIG. 4 is a schematic view of the microphone array in the smart glasses according to the embodiment shown in FIG. 2.

Preferably, as shown in FIG. 4, in order to reduce the weight of the glasses, only one microphone array is installed on the smart glasses. The first microphone M1, the second microphone M2 and the third microphone M3 in the microphone array are all installed on the same temple, and the first microphone M1 and the second microphone M2 are closer to the frame than the third microphone M3.

The controller 1041 is further configured to control the first microphone M1 and the second microphone M2 to obtain voice data in the call mode, and to control the first microphone M1, the second microphone M2 and the third microphone M3 to obtain voice data in the hearing aid mode. By controlling microphones at different positions to pick up sound in different modes, noise in the acquired voice data can be reduced and the signal processing speed can be increased.

Optionally, the smart glasses further include a battery 204. The battery 204 is installed on the first temple 102A and is electrically connected to the wireless communication module 104 for providing power to the wireless communication module 104, sensors, speakers, and microphones and other electronic components of the smart glasses.

Optionally, the smart glasses further include at least one hearing aid (not shown in the figure), which is installed on the first temple 102A and/or the second temple 102B and is electrically connected to the wireless communication module 104. The wireless communication module 104 is further configured to control the at least one hearing aid to output voice data in the hearing aid mode.

Optionally, the smart glasses further include at least one control button (not shown in the figure), which is installed on the outside of the first temple 102A and/or the second temple 102B and is electrically connected to the wireless communication module 104. The at least one control button is configured to trigger the wireless communication module 104 to control and switch the operation modes or running states of the smart glasses. The running states include an idle state and a working state, and the working state includes the call mode and the hearing aid mode.

The above-mentioned electronic components of the smart glasses can be connected through a bus.

It should be noted that the above-mentioned components of the smart glasses are replaceable or combinable. That is, all the components in the above embodiment can be installed on the same smart glasses, or only part of the above components are selectively installed on the same smart glasses as required. In the case that some components are to be replaced, the smart glasses are further provided with a peripheral connection interface. The connection interface can be, for example, at least one of a PS/2 interface, a serial interface, a parallel interface, an IEEE1394 interface, and a USB (Universal Serial Bus) interface. The function of the to-be-replaced component can be implemented through peripherals connected to the connection interface, such as: external speakers, external sensors, etc.

In this embodiment, the wireless communication module is configured to control and switch the operation modes of the smart glasses, on the one hand, to perform the first beamforming processing on the voice data acquired by the sound pickup device in the call mode, so that the sound beam pickup of the sound pickup device is directed downward, on the other hand, to perform the second beamforming processing on the voice data in the hearing aid mode, so that the sound beam pickup of the sound pickup device is directed forward, thereby implementing the telephone call function and the hearing aid function based on the same hardware platform of the smart glasses, increasing the functions of the smart glasses. In addition, since there is no need to install additional hearing aid device on the smart glasses, the weight of the smart glasses can be reduced, power consumption can be reduced, and the manufacturing cost of the smart glasses can be reduced.

Figure 5:
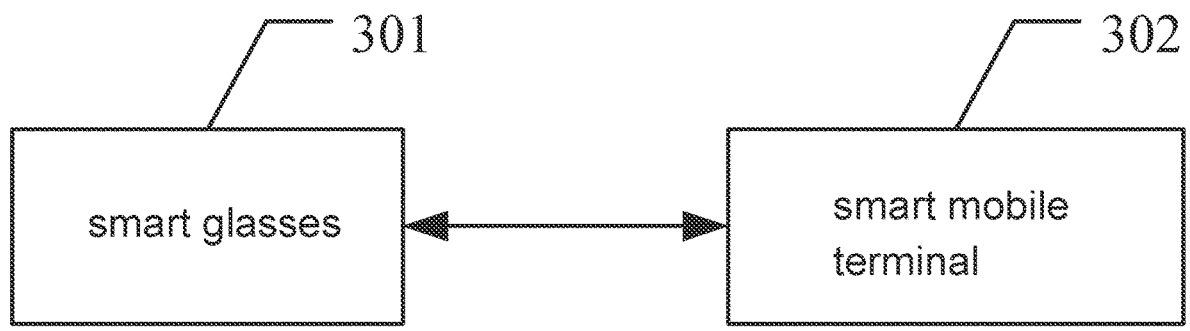
FIG. 5 is a schematic view of a smart glasses control system according to an embodiment of the present disclosure.

Referring to FIG. 5, FIG. 5 is a schematic view of a smart glasses control system according to an embodiment of the present disclosure. As shown in FIG. 5, the smart glasses control system includes smart glasses 301 and a smart mobile terminal 302.

The structure of the smart glasses 301 is the same as that of the smart glasses according to the embodiment shown in FIGS. 1 to 4. For details about the structure and functions of the smart glasses 301, please refer to the relevant descriptions in the embodiment shown in FIGS. 1 to 4.

The smart mobile terminal 302 may be, but not limited to: cellular phone, smart phone, other wireless communication device, personal digital assistant, audio player, other media player, music recorder, video recorder, camera, other media recorder, smart radio, Laptop computer, personal digital assistant (PDA), portable multimedia player (PMP), Moving Picture Experts Group (MPEG-1 or MPEG-2) audio layer 3 (MP3) player, digital camera, and smart wearable device (such as smart watch, smart bracelet, etc.). An Android or IOS operating system is installed on the smart mobile terminal 302.

The smart mobile terminal 302 is used for data interaction with the smart glasses 301, specifically, for example, to receive and store the data sent by the smart glasses 301 and process the same, and to send the played music data and the received call voice data to the smart glasses 301 when performing target tasks such as playing music data and having a telephone call and so on. The communication protocol used by the smart mobile terminal 302 when performing data interaction with the smart glasses 301 is consistent with the communication protocol used by the smart glasses 301.

Figure 6:
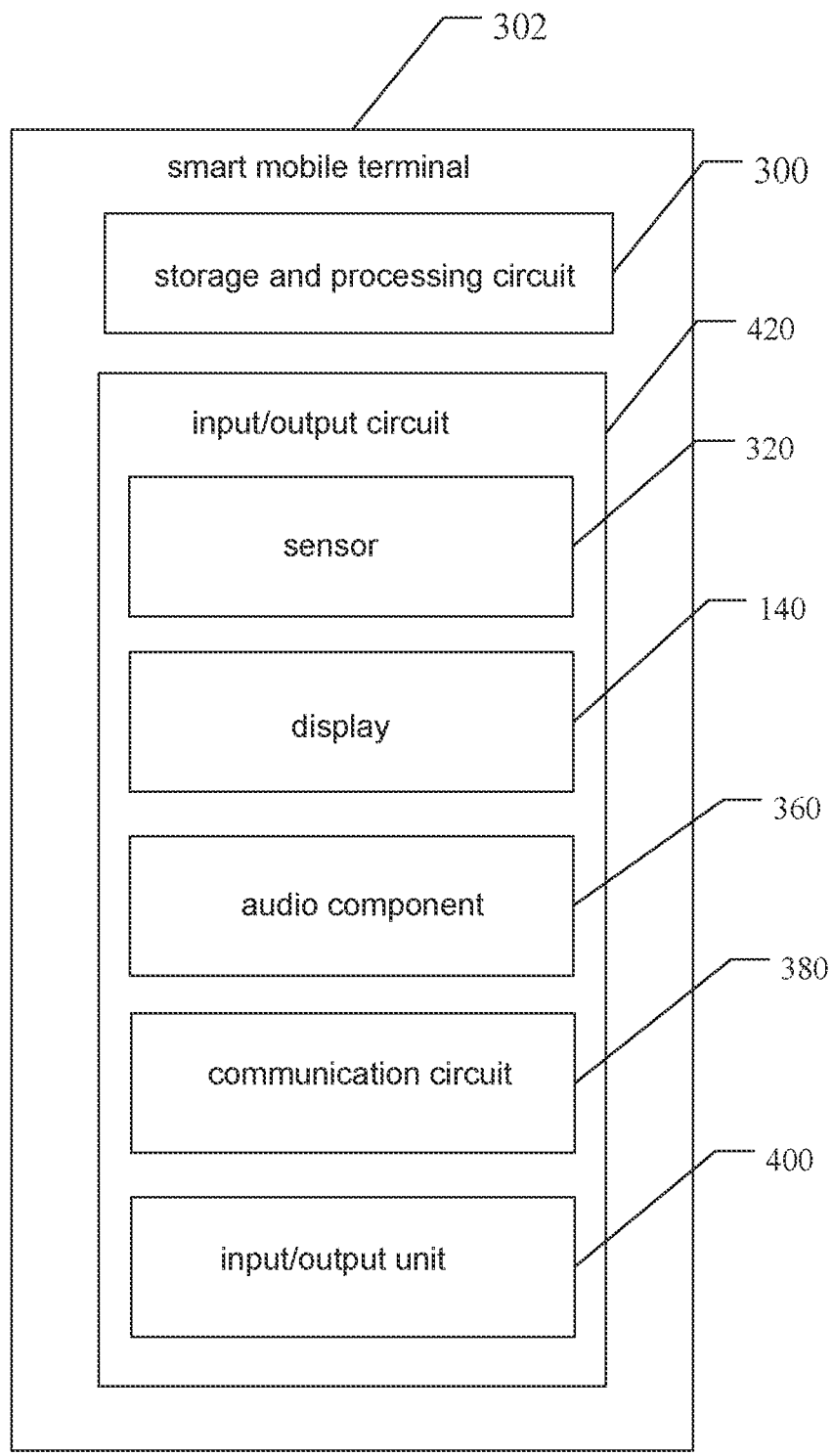
FIG. 6 is a schematic view of a smart glasses control system according to another embodiment of the present disclosure.

As shown in FIG. 6, the smart mobile terminal 302 can include a control circuit. The control circuit can include a storage and processing circuit 300. The storage and processing circuit 300 can include a memory such as a hard disc drive memory, a non-volatile memory (such as flash memory or other electronically programmable read-only memory configured to form a solid state drive, etc.), a volatile memory (such as static or dynamic random access memory, etc.), or the like, which is not limited in the embodiments of the present disclosure. The processing circuit in the storage and processing circuit 300 can be configured to control the operation of the smart mobile terminal 302. The processing circuit can be implemented based on one or more microprocessors, microcontrollers, digital signal processors, baseband processors, power management units, audio codec chips, application specific integrated circuits, display driver integrated circuits, etc.

The storage and processing circuit 300 can be configured to run software in the smart mobile terminal 302, such as: Artificial Intelligence Butler application, Internet Browsing application, Voice over Internet Protocol (VOIP) telephone call application, Email application, Media Player application, Operating System Functions, etc. These software can be used to perform some control operations, such as data processing and analysis of motion data sent by smart glasses 301 based on preset analysis algorithm, image acquisition based on camera, ambient light measurement based on ambient light sensor, proximity sensor measurement based on proximity sensor, information display function based on status indicator such as light emitting diode, touch event detection based on touch sensor, functions associated with displaying information on multiple (e.g. layered) displays, operations associated with performing wireless communication functions, operations associated with collecting and generating audio signals, control operations associated with collecting and processing button press event data, and other functions in the smart mobile terminal 302, which are not limited in the embodiments of the present disclosure.

Further, the memory stores executable program code, and the processor coupled with the memory invokes the executable program code stored in the memory and executes the relevant steps in the following method embodiments of the present disclosure to implement the various functions of the smart mobile terminal 302 in the embodiments of the present disclosure.

The smart mobile terminal 302 can further include an input/output circuit 420. The input/output circuit 420 enables the smart mobile terminal 302 to input and output data, that is, allows the smart mobile terminal 302 to receive data from an external device and also allows the smart mobile terminal 302 to output data from the smart mobile terminal 302 to an external device. The input/output circuit 420 can further include a sensor 320. The sensor 320 can include an ambient light sensor, a light- and capacitive-based proximity sensor, a touch sensor (e.g., a light-based touch sensor and/or a capacitive touch sensor, and the touch sensor may be an integral part of a touch display or a separate touch sensor), an accelerometer, and other sensors.

The input/output circuit 420 can further include one or more displays, such as display 140. The display 140 can include one or more of a liquid crystal display, an organic light emitting diode display, an electronic ink display, a plasma display, and displays using other display technologies. The display 140 can include a touch sensor array, that is, the display 140 can be a touch display. The touch sensor may be a capacitive touch sensor formed from an array of transparent touch sensor electrodes (such as indium tin oxide (ITO) electrodes), or may be a touch sensor formed using other touch technologies, such as sonic touch, pressure sensitive touch, resistive touch, optical touch, etc., which is not limited in the embodiments of the present disclosure.

The smart mobile terminal 302 can further include an audio component 360. The audio component 360 may be used to provide audio input and output functions for the smart mobile terminal 302. The audio components 360 in the smart mobile terminal 302 may include a speaker, a sound pickup device, a buzzer, a tone generator, and other components for generating and detecting sounds.

The communication circuit 380 enables the smart mobile terminal 302 to communicate with external devices. The communication circuit 380 can include an analog and digital input/output interface circuit, and a wireless communication circuit based on radio frequency signals and/or optical signals. The wireless communication circuit in the communication circuit 380 can include a radio frequency transceiver circuit, a power amplifier circuit, a low noise amplifier, a switch, a filter, and an antenna. For example, the wireless communication circuit in the communication circuit 380 can include a circuit for supporting near field communication (NFC) by transmitting and receiving near field coupling electromagnetic signals. For example, the communication circuit 380 can include a near field communication antenna and a near field communication transceiver. The communication circuit 380 can further include a cellular phone transceiver and antenna, a wireless LAN (such as Bluetooth, WiFi, ZigBee, DLNA, UWB, RFID) transceiver circuit and antenna, etc.

The smart mobile terminal 302 can further include a battery, a power management circuit, and other input/output units 400. The input/output units 400 can include a button, a joystick, a click wheel, a scroll wheel, a touch pad, a keypad, a keyboard, a camera, a light emitting diode and other status indicators.

The user can input commands through the input/output circuits 420 to control the operation of the smart mobile terminal 302, and can receive state information and other output from the smart mobile terminal 302 through the output data of the input/output circuit 420.

Figure 7:
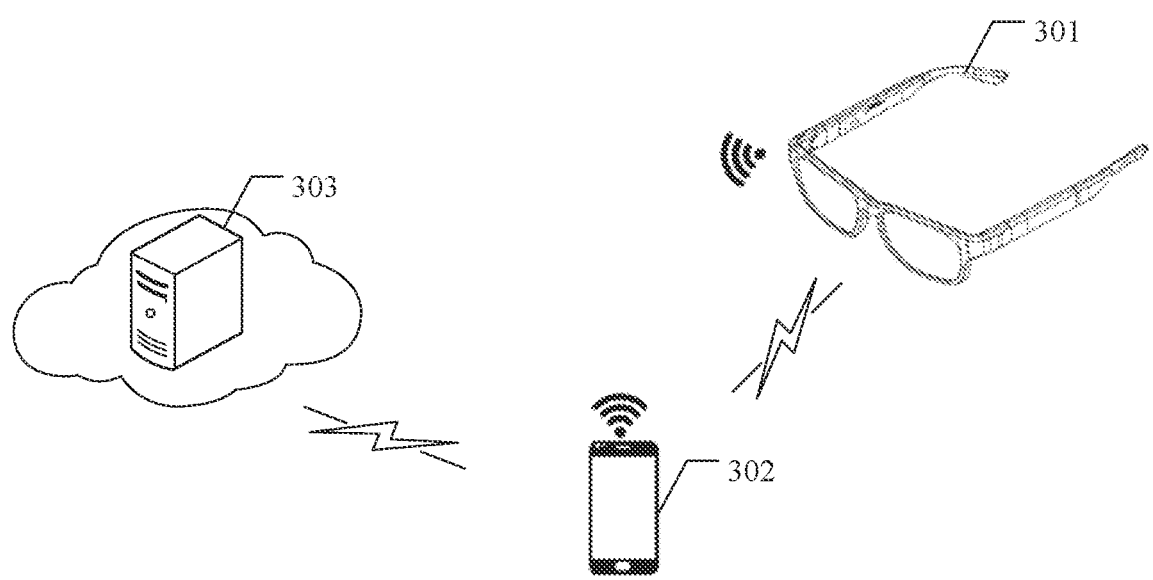
FIG. 7 is a schematic view of the hardware structure of the smart mobile terminal in the smart glasses control system shown in FIGS. 5 and 6.

Further, as shown in FIG. 7, in another embodiment of the present disclosure, the smart glasses control system further includes a cloud smart device 303. The cloud smart device 303 can be, for example, a cloud server or a cloud server cluster, for data interaction with the smart mobile terminal 302, storing data sent by the smart mobile terminal 302, and processing the data based on a preset processing logic. For example, the cloud smart device 303 can be configured to analyze the motion data sent by the smart mobile terminal 302 based on the preset analysis logic to statistically analyze the motion index parameters of the wearer of the smart glasses 301, and provide reference proposals to the smart mobile terminal 302 by referring the motion index parameters of other smart mobile terminals. For example, when the cloud smart device 303 finds that the motion indexes set by users on other smart mobile terminals are more reasonable, it can send the proposal information to the smart mobile terminal 302 to remind the user to reset.

Preferably, a Bluetooth protocol is used as the communication protocol between the smart mobile terminal 302 and the smart glasses 301, and a cellular mobile communication protocol (such as 2G, 3G, 4G, 5G protocol, etc.) is used as the communication protocol between the cloud smart device 303 and the smart mobile terminal 302.

Further, the smart mobile terminal 302 is configured for pairing with the smart glasses 301 based on the Bluetooth protocol, and sending the played music data to the smart glasses 301 after successful pairing so that the music data can be played through the smart glasses 301.

Optionally, the smart mobile terminal 302 is further configured to send the above-mentioned sound pickup direction control command to the smart glasses 301 according to the user's sound pickup direction selection operation;

The smart mobile terminal 302 is further configured to send the above-mentioned volume adjustment control command to the smart glasses 301 according to the user's volume adjustment operation.

The smart mobile terminal 302 has a built-in client application (APP) for controlling and modifying relevant parameters of the smart glasses. The user can perform the sound pickup direction selection operation and the volume adjustment operation in the human-computer interaction interface provided by the APP. The sound pickup direction selection operation may include, for example, but not limited to: the operation of the user clicking a button, key or menu preset in the human-computer interaction interface for selecting the sound pickup direction of the smart glasses 301. The volume adjustment control command may include, for example, but not limited to: the operation of the user clicking a button, key or menu preset in the human-computer interaction interface for adjusting the frequency band and/or volume of the sound data played by the smart glasses 301 and the speaker for playing the sound data.

Optionally, the smart mobile terminal 302 is further configured to obtain GPS data through a GPS module configured on the smart mobile terminal, and send the obtained GPS data to the smart glasses 301 for positioning the smart glasses 301.

Optionally, the smart mobile terminal 302 is further configured to receive and store the motion data sent by the smart glasses 301 in real time, calculate motion indexes based on the motion data and the GPS data, generate real-time voice data according to the calculated results to notify or remind the user of the motion state, and send the real-time voice data to the smart glasses 301 for output. The real-time voice data includes notification or reminder voice of the calculated results of the motion indexes.

Specifically, the smart mobile terminal 302 can be installed with a client application, such as an Artificial Intelligence Butler App, through which data interaction operations with the smart glasses 301 and processing and analyzing of the motion data sent by the smart glasses 301, such as running index calculation, posture monitoring and reminder, etc., can be performed.

The above music data and real-time voice data belong to the data of the downlink channel of the smart glasses 301. The smart glasses 301 perform voice equalization processing and output volume control processing on the received music data and real-time voice data through the voice data processor 1042 and then send them to the first speaker 201 and the second speaker 202 for output.

Specifically, the motion data includes data obtained by the smart glasses 301 through the 9-axis sensor, i.e., Ax, Ay, Az; Gx, Gy, Gz; Mx, My, Mz, and the motion indexes are running indexes including pace, distance, step count, left and right balance of head, step count, step distance and step frequency. The 9-axis sensor refers to the accelerometer, gyroscope and magnetic sensor. The data measured by these three types of sensors can be each decomposed into forces in three axis directions of X, Y, and Z in a spatial coordinate system, so they are also called 3-axis accelerometer, 3-axis gyroscope, and 3-axis magnetic sensor respectively.

The smart mobile terminal 302 is further configured to perform index calculation, posture monitoring and motion reminder operations based on the motion data obtained by the 9-axis sensor and local GPS data, and display the calculated index results in real time through the display of the smart mobile terminal 302.

Optionally, the smart mobile terminal 302 is further configured to perform operation of making, answering or hanging up a call in response to the voice command sent by the smart glasses 301, and during the call, send the received call voice data to the smart glasses 301, to play the call voice data through the speaker on the smart glasses 301.

The voice command is obtained by the voice data processor of the smart glasses 301 by using a preset voice recognition algorithm to perform voice command recognition processing on the voice data acquired by the sound pickup device of the smart glasses 301.

It can be understood that the body of the smart glasses 301 in the present disclosure is provided with at least two microphones. The user can give a voice command and answer a call through the microphones on the smart glasses 301 for obtaining the voice data. The sound emitted by the user is picked up by the microphones on the smart glasses 301 and is played through the speaker of the smart glasses 301 after noise reduction processing. Therefore, during the call, the user can put the smart mobile terminal 302 in his/her pocket or on the table, and thus his/her hands are free for other purposes, thereby improving the convenience of answering a call.

It should be noted that, for the specific implementation of the functions of the smart glasses 301 and the smart mobile terminal 302 in this embodiment, reference can also be made to the relevant descriptions in other embodiments.

In this embodiment, the wireless communication module is configured to control and switch the operation modes of the smart glasses, on the one hand, to perform the first beamforming processing on the voice data acquired by the sound pickup device in the call mode, so that the sound beam pickup of the sound pickup device is directed downward, on the other hand, to perform the second beamforming processing on the voice data in the hearing aid mode, so that the sound beam pickup of the sound pickup device is directed forward, thereby implementing the telephone call function and the hearing aid function based on the same hardware platform of the smart glasses, increasing the functions of the smart glasses. In addition, since the functions of some components (such as the GPS module) are implemented through the smart mobile terminal, the structure of the smart glasses can be simplified, thereby reducing the weight of the smart glasses, reducing the power consumption, and reducing the manufacturing cost of the smart glasses.

Figure 8:
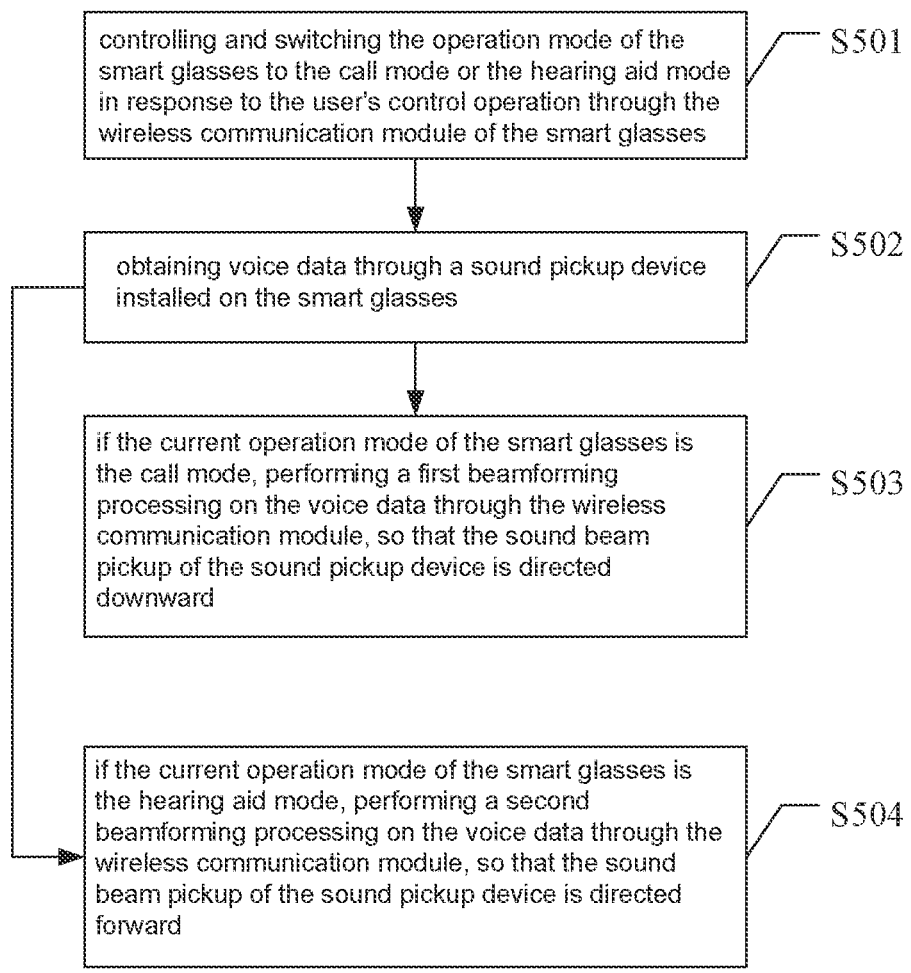
FIG. 8 is a schematic flow chart of a smart glasses control method according to an embodiment of the present disclosure.

Referring to FIG. 8, FIG. 8 is a schematic flow chart of a smart glasses control method according to an embodiment of the present disclosure. The structure of the smart glasses in this embodiment is the same as that of the smart glasses according to the embodiment shown in FIGS. 1 to 4. For details, please refer to the relevant descriptions in the embodiment shown in FIGS. 1 to 4. As shown in FIG. 8, the method includes the following steps.

In step S501, the operation mode of the smart glasses is controlled and switched to the call mode or the hearing aid mode in response to the user's control operation through the wireless communication module of the smart glasses.

Figure 9:
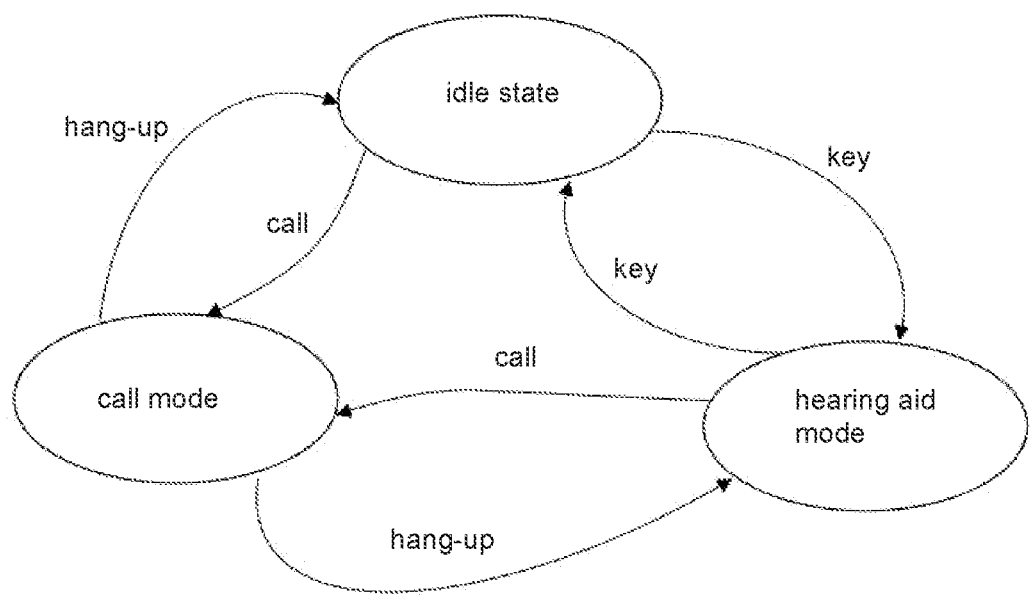
FIG. 9 is a schematic view of the running state and operation mode of smart glasses in the smart glasses control method according to the embodiment of the present disclosure.

As shown in FIG. 9, the running states of the smart glasses include an idle state and a working state. In the working state, the smart glasses have two operation modes: a call mode and a hearing aid mode. In the call mode, the user uses the telephone call function of the smart glasses to have a telephone conversation with the person on the other end of the network through the mobile communication terminal and the wireless communication network. In the hearing aid mode, the user uses the hearing aid function of the smart glasses to have a face-to-face conversation with other people.

Optionally, the smart glasses can switch to different running states and operation modes according to different preset events monitored. For example, in the idle state, when a call event is monitored, the smart glasses are controlled through the wireless communication module of the smart glasses to switch to the call mode, and then in the call mode, when a hang-up event is monitored, the smart glasses are controlled through the wireless communication module to return to the idle state; in the hearing aid mode, when a call event is monitored, the smart glasses are controlled through the wireless communication module to switch to the call mode, and then in the call mode, when a hang-up event is monitored, the smart glasses are controlled through the wireless communication module to return to the hearing aid mode; in the idle state, when a key event is monitored, the smart glasses are controlled through the wireless communication module to switch to the hearing aid mode, and then in the hearing aid mode, when a key event is monitored again, the smart glasses are controlled through the wireless communication module to return to the idle state.

The above-mentioned call event and hang-up event can be monitored through the smart mobile terminal. When the smart mobile terminal monitors the call event or hang-up event through a built-in event monitor, it generates notification information of the monitored event and sends the same to the smart mobile terminal. The smart glasses receive the notification information through the wireless communication module and confirm that the corresponding event is detected.

Optionally, the smart glasses can be further provided with 3 state control buttons, corresponding to different running states and operation modes respectively. The smart glasses respond to the user's control operation of clicking a button through the wireless communication module and enter the corresponding running state or operation mode corresponding to the clicked button.

In step S502, voice data is obtained through a sound pickup device installed on the smart glasses.

Specifically, at least two speakers as the sound pickup device are installed on the smart glasses for collecting voice data of a user of the smart glasses or a conversation partner of the user.

Optionally, a speaker array consisting of three speakers is installed on one temple of the smart glasses, wherein the first microphone and the second microphone are closer to the frame than the third microphone. Step S502 specifically includes:

step S5021: after controlling and switching the operation mode of the smart glasses to the call mode, controlling the first microphone and the second microphone to obtain the user's voice data through the wireless communication module; and step S5022: after controlling and switching the operation mode of the smart glasses to the hearing aid mode, controlling the first microphone, the second microphone and the third microphone to obtain the voice data of the user's conversation partner through the wireless communication module.

By controlling microphones at different positions to pick up sound in different modes, noise in the acquired voice data can be reduced and the signal processing speed can be increased.

In step S503, if the current operation mode of the smart glasses is the call mode, a first beamforming processing on the voice data is performed through the wireless communication module, so that the sound beam pickup of the sound pickup device is directed downward.

In step S504, if the current operation mode of the smart glasses is the hearing aid mode, a second beamforming processing on the voice data is performed through the wireless communication module, so that the sound beam pickup of the sound pickup device is directed forward.

Figure 10:
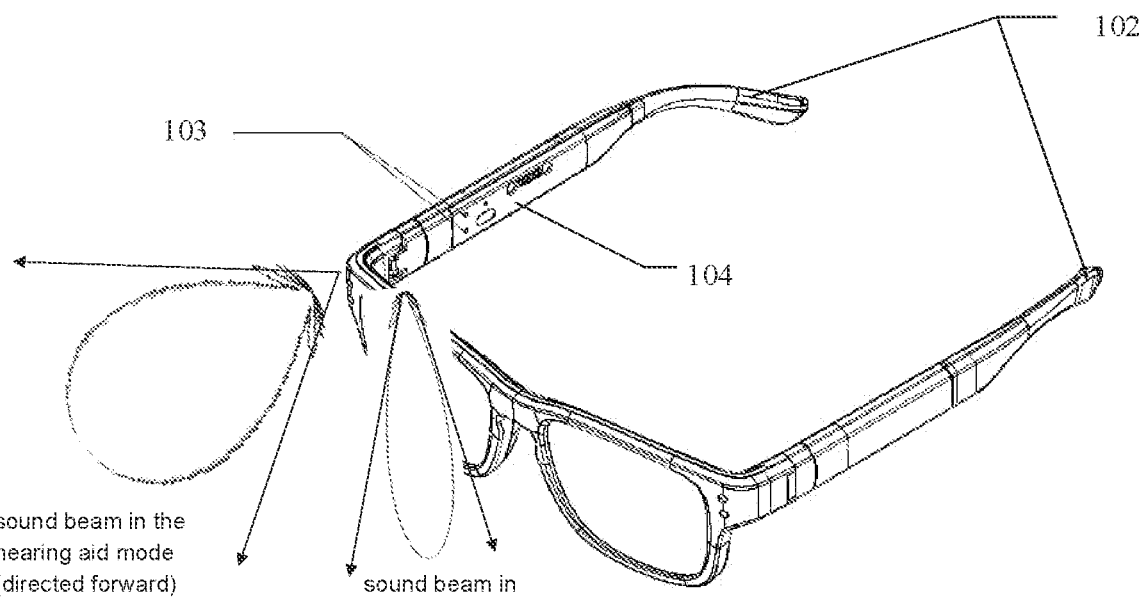
FIG. 10 is a schematic view of the sound beam direction of the microphone array in different operation modes in the smart glasses control method according to the embodiment of the present disclosure.

As shown in FIG. 10, in order to achieve better sound pickup effect, the present disclosure uses a preset algorithm to process the voice data, so that the sound beam pickup of the microphone array is directed to different directions respectively in the hearing aid mode and the call mode.

Figure 11:
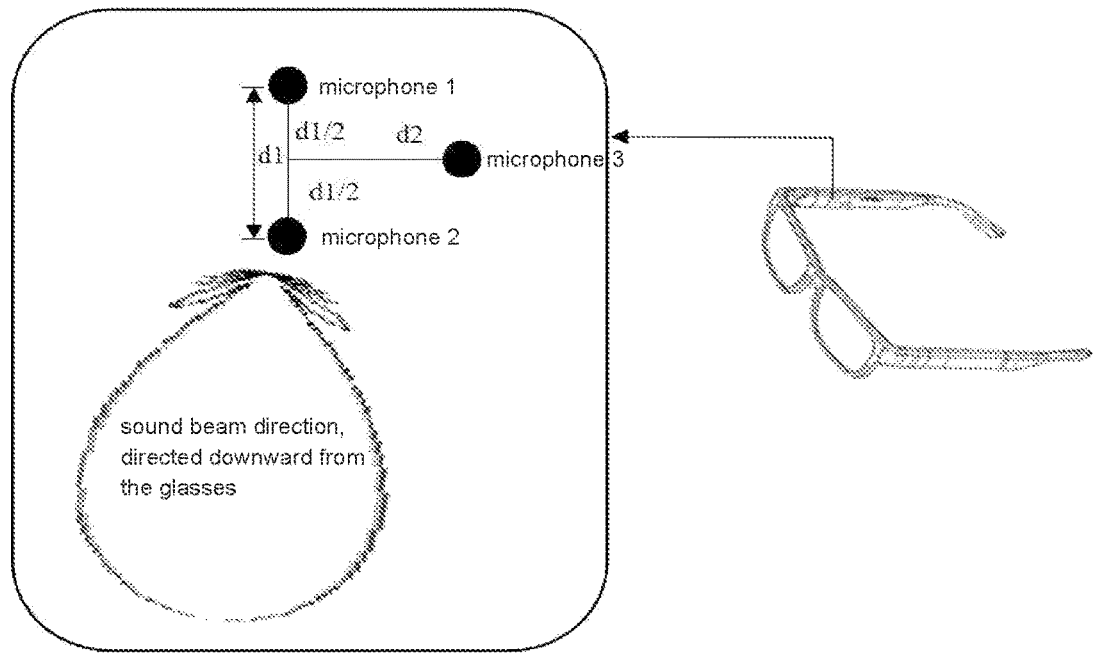
FIG. 11 is a schematic view of the sound beam direction of the microphone array in the call mode in the smart glasses control method according to the embodiment of the present disclosure.

As shown in FIG. 11, in the call mode, only microphones 1 and 2 are used to obtain the user's voice, and the distance from microphone 3 to microphone 1 is equal to the distance from microphone 3 to microphone 2. Based on a preset beamforming algorithm, the smart glasses are configured so that the sound beam pickup of the microphone array installed on the smart glasses is directed downward, so as to better obtain the voice data from the wearer of the smart glasses. In the call mode, based on the beamforming algorithm, the microphone array only receives sound from below, that is, the sound beam pickup of the microphone array is directed towards the user's mouth, and the intensity of sound waves from other directions is reduced.

Figure 12:
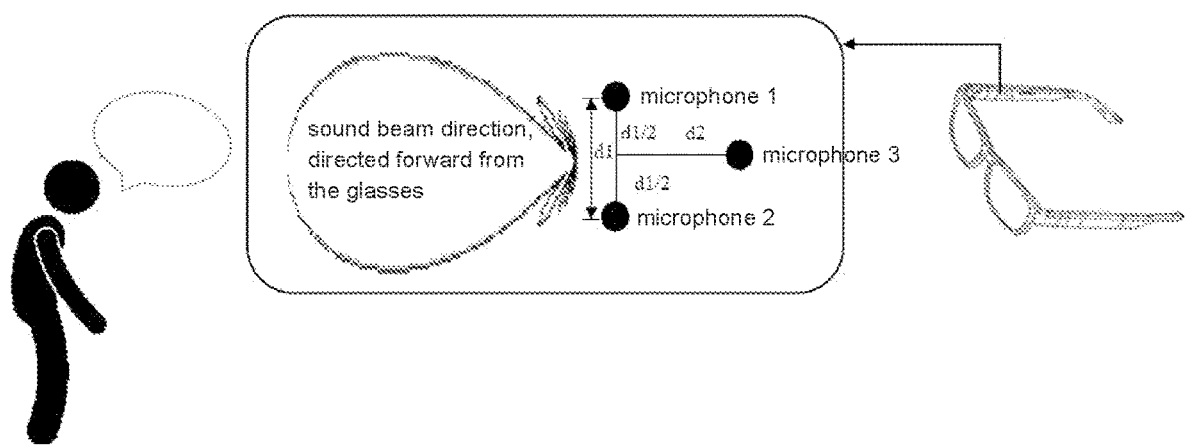
FIG. 12 is a schematic view of the sound beam direction of the microphone array in the hearing aid mode in the smart glasses control method according to the embodiment of the present disclosure.

As shown in FIG. 12, in the hearing aid mode, microphones 1, 2 and 3 are all used to obtain the conversation partner's voice, and the distance from microphone 3 to microphone 1 is equal to the distance from microphone 3 to microphone 2. Based on a preset beamforming algorithm, the smart glasses is configured so that the sound beam pickup of the microphone array is directed to a preset angle forward, so as to better obtain the voice data of the wearer's conversation partner from the front of the smart glasses. In the hearing aid mode, based on the beamforming algorithm, the sound behind the smart glasses is deleted due to phase difference of different microphones in the microphone array, where the sound waves from the front of the smart glasses (in the same phase, phase difference=0 degree) are amplified, the sound waves from the sides of the smart glasses (0<phase difference<180 degrees) are reduced, and the sound waves from the back of the smart glasses (in the different phase, phase difference=180 degrees) are deleted, so that the microphone array only receives the front sound waves.

Further, in addition to the above-mentioned beamforming algorithm, the smart glasses also execute other corresponding algorithms on the voice data through the DSP in the wireless communication module according to the state of the smart glasses and the received instructions from the user.

Figure 13:
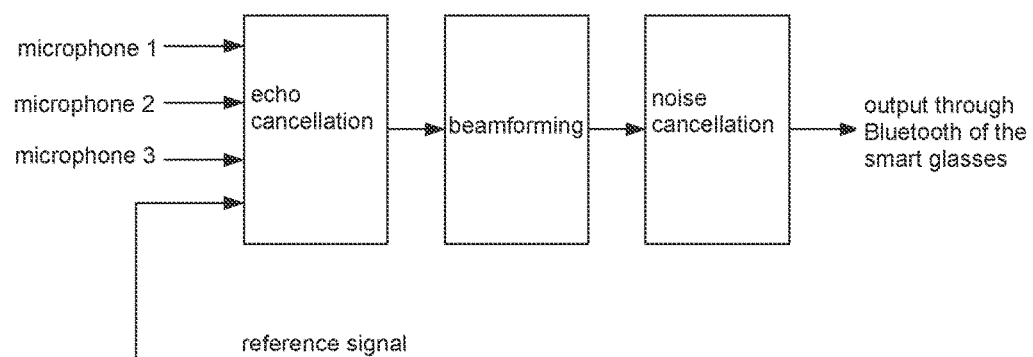
FIG. 13 is a schematic view of the voice signal processing process in the call mode in the smart glasses control method according to the embodiment of the present disclosure.

As shown in FIG. 13, in the call mode, the smart glasses use the DSP to perform voice equalization processing and output volume processing on the data of the downlink channel, and sequentially perform echo cancellation processing, first beamforming processing, and noise cancellation processing on the data of the uplink channel. The data of the downlink channel is input through the wireless signal transceiver in the wireless communication module. The wireless signal transceiver preferentially uses the Bluetooth protocol as the communication protocol.

Further, in the call mode, the smart glasses use the DSP to sequentially perform voice equalization processing and output volume control processing on the call voice data from the smart mobile terminal input through the wireless signal transceiver (such as the wireless Bluetooth of the smart glasses as shown in FIG. 13), and send the call voice data after the output volume control processing to the speaker of the smart glasses for output; and use the DSP to perform echo cancellation processing on the voice data acquired by the sound pickup device by using the call voice data after the output volume processing as a reference signal, then perform first beamforming processing and noise cancellation processing, and output the data after the noise cancellation processing to the smart mobile terminal through the wireless signal transceiver.

As the voice of the conversation partner is played through the speaker, and the voice signal of the conversation partner is picked up by the microphone array, a loop would be created. The echo cancellation processing on the voice data of the uplink channel uses an echo cancellation algorithm to compare the output signal of the speaker and the input signal of the microphone array to cancel the echo and interrupt the loop between the speaker and the microphone array.

The noise cancellation processing on the voice data of the uplink channel uses a noise cancellation algorithm to reduce or cancel the noise volume and amplify the volume of the conversation partner's volume. Based on the noise cancellation algorithm, even if the user is in a place with a lot of ambient noise, the conversation partner would not hear noisy ambient noise, but only hears the clear voice from the user of the smart glasses.

The voice equalization processing on the voice data of the downlink channel uses a voice equalizer to perform voice equalization processing on the voice signal of the conversation partner, to strengthen the frequency signal of the user for the hard of hearing, thereby compensating the frequency signal for the hard of hearing.

The output volume control processing on the voice data of the downlink channel uses an output volume control algorithm to adjust the output volume of the speaker.

Optionally, the wireless signal transceiver uses at least one of Bluetooth protocol, Wireless Fidelity protocol, Near Field Communication protocol, ZigBee protocol, Digital Living Network Alliance protocol, Ultra Wideband protocol, Radio Frequency Identification protocol and Cellular Mobile Communication protocol as a communication protocol for data interaction with the smart mobile terminal.

Further, in other embodiments of the present disclosure, before acquiring the voice data through the sound pickup device, the method further includes:
  performing Bluetooth pairing with the smart mobile terminal through the wireless communication module based on the Bluetooth protocol to establish a data transmission channel between the smart glasses and the smart mobile terminal. Subsequent data interaction between smart glasses and the smart mobile terminal can be performed through this data transmission channel.

Figure 14:
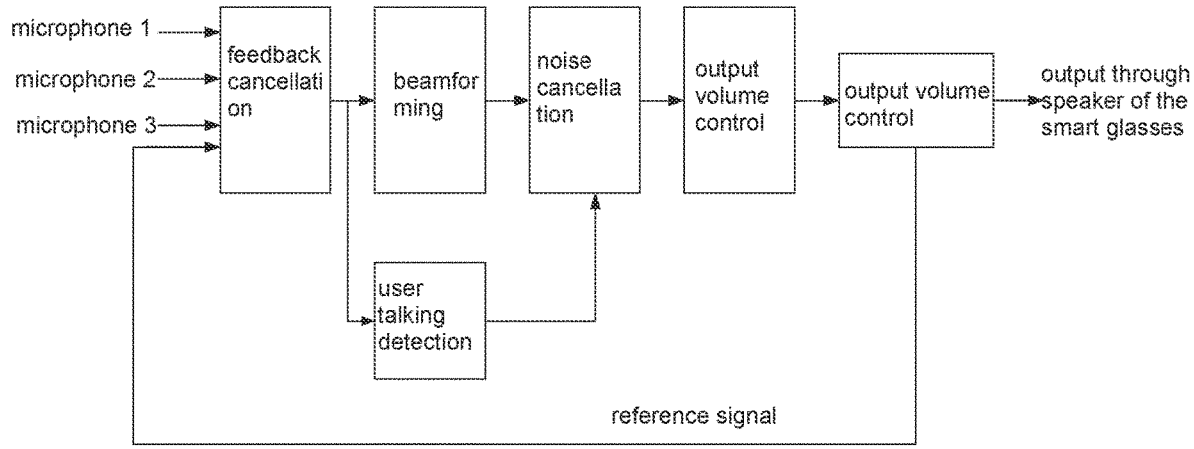
FIG. 14 is a schematic view of the processing process of voice signals and call voice signals in the hearing aid mode in the smart glasses control method according to the embodiment of the present disclosure.

As shown in FIG. 14, in the hearing aid mode, the smart glasses use the DSP to perform feedback cancellation processing, second beamforming processing, noise cancellation processing, voice equalization processing, and user talking detection processing on the voice data, and sent the voice data after voice equalization processing to the speaker of the smart glasses for output, with the voice data after voice equalization processing as reference data for the feedback cancellation processing. Furthermore, before sending the voice data after the voice equalization processing to the speaker of the smart glasses for output, the output volume control processing can be performed on the voice data after the voice equalization processing. The specific output volume control processing method is the same as that shown in FIG. 13. For details, please refer to the relevant descriptions in FIG. 13 above, and will not be repeated here.

In the hearing aid mode, the sound waves output by the speaker will be immediately received by the microphone array, thereby forming a loop, resulting in a harsh howling. The feedback cancellation processing uses a feedback cancellation algorithm to cancel the echo by comparing the output signal of the speaker and the input signal of the microphone array, and interrupt the loop between the speaker and the microphone array.

In addition, in the hearing aid mode, the conversation partner's sound needs to be amplified so that the hearing-impaired user can hear the conversation partner's speech clearly. However, by amplifying the sound, the voice and noise will be amplified together, thus bringing discomfort to the user. Noise cancellation processing uses a noise cancellation algorithm to reduce or cancel the noise volume and at the same time amplify the speaking volume of the conversation partner.

In addition, in the hearing aid mode, the hearing-impaired user is usually just unable to clearly hear or cannot hear sounds of a specific frequency. The voice equalization processing uses a voice equalizer to enhance the sound signal of the specific frequency, thereby compensating the sound signal of the specific frequency.

In addition, since the microphone array of the smart glasses is very close to the user's mouth, when the user speaks, the microphone array will receive strong signals and play the same on the speaker of the smart glasses, so that the user will hear his/her own voice through the speaker. The user talking detection processing uses a user talking detection algorithm to continuously detect and analyze the signals received by the microphone array, and when a signal from the user's voice is detected, reduces the volume of the signals received through the microphone array to a preset level.

Figure 15:
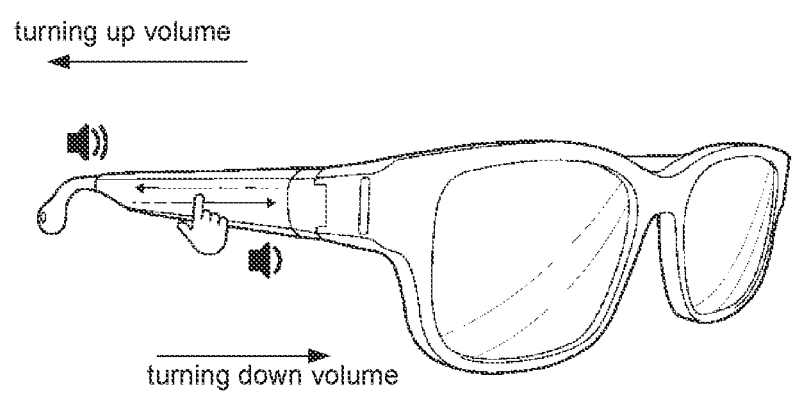
FIG. 15 is a schematic view of the volume adjustment control of smart glasses in the smart glasses control method according to another embodiment of the present disclosure.

Optionally, in other embodiments of the present disclosure, the method further includes: detecting the user's first control operation through a touch sensor installed on the temple of the smart glasses, where the first control operation is intended to adjust the volume; and when the touch sensor detects the first control operation, controlling and adjusting the volume of the sound output by the smart glasses through the wireless communication module in response to the first control operation. The first control operation includes a control operation for turning up the volume and a control operation for turning down the volume. As shown in FIG. 15, the control operation for turning up the volume corresponds to the action of the user's finger sweeping toward the ear on the touch sensor, and the control operation for turning down the volume corresponds to the action of the user's finger swiping toward the frame on the touch sensor.

Optionally, in other embodiments of the present disclosure, the detection of the control operation in step S501 can be specifically performed by the touch sensor installed on the temple of the smart glasses.

Specifically, the user's second control operation is detected through the touch sensor. When the second control operation is detected through the touch sensor, the operation mode of the smart glasses is controlled and switched to the call mode or the hearing aid mode through the wireless communication module in response to the second control operation, where the second control operation corresponds to the user's action of long pressing the touch sensor. For example, when it is detected that the user long presses the touch sensor for more than 3 seconds, the operation mode of the smart glasses will be switched to the call mode or the hearing aid mode, depending on the operation mode before switching. For example, if the operation mode before switching is the call mode, the operation mode of the smart glasses will be switched to the hearing aid mode.

Alternatively, a control button is installed on the outside of the temple or the frame of the smart glasses. When the user clicking on the control button is detected, the operation mode of the smart glasses is controlled and switched to the call mode or the hearing aid mode through the wireless communication module.

Optionally, in other embodiments of the present disclosure, the method further includes the following steps:
step S601: detecting whether the user wears or takes off the smart glasses through the proximity sensor installed on the inside of the temple of the smart glasses;
step S602: when the proximity sensor detects that the user is wearing the smart glasses, controlling the speaker of the smart glasses to play audio data through the wireless communication module; and
step S603: when the proximity sensor detects that the user has taken off the smart glasses, controlling the speaker to stop playing the audio data through the wireless communication module, and when the proximity sensor detects that the user has taken off the smart glasses for more than a preset period of time, performing shutdown operation through the wireless communication module to reduce power consumption.

When the proximity sensor detects that the user is wearing the smart glasses, the audio data played by the smart glasses includes any one of: the unplayed music data when the user took off the smart glasses last time, the default music data stored in the built-in memory of the smart glasses, and music data or call voice data received from the smart mobile terminal through the wireless signal transceiver when the user wears the smart glasses. The memory can be electrically connected to the wireless communication module of the smart glasses through a bus, or the memory can be the MCU memory in the wireless communication module.

Optionally, in other embodiments of the present disclosure, before performing first beamforming processing on the voice data through the wireless communication module, the method further includes the following steps:
step S701: performing voice recognition on the voice data through the wireless communication module, and sending the recognized voice command to the smart mobile terminal;
step S702: in response to the voice command, the smart mobile terminal performing the operation directed by the voice command, where the operation directed by the voice command includes any one of making a call, answering a call, and hanging up a call; and
step S703: when the operation directed by the voice command is to make or answer a call, the smart mobile terminal sending the received call voice data to the smart glasses to output the call voice data through the speaker of the smart glasses.

Optionally, in other embodiments of the present disclosure, the method further includes the following steps:
step S801: obtaining the user's motion data through the motion sensor installed on the smart glasses, and sending the motion data to the smart mobile terminal in real time through the wireless communication module; and
step S802: the smart mobile terminal receiving and storing the motion data in real time, calculating motion indexes based on the motion data and GPS data, generating real-time voice data for notifying or reminding the user of the motion state based on the calculated results, and sending the real-time voice data to the smart glasses to output the real-time voice data through the speaker of the smart glasses.

The GPS data is obtained through the GPS module of the smart mobile terminal.

Further, the motion sensor is a 9-axis sensor, and the motion indexes are running indexes. The running indexes include: pace, distance, step count, left and right balance of head, step count, step distance and step frequency.

The method further includes the following steps:
step S803: the smart mobile terminal performing index calculation, posture monitoring and motion reminder operations based on the motion data and the GPS data, and displaying the calculated index results in real time through the display of the smart mobile terminal.

Specifically, the motion data includes sense data obtained by the 9-axis sensor, such as: 3-dimensional accelerometer data Ax, Ay, Az; 3-dimensional gyroscope data Gx, Gy, Gz; and 3-dimensional magnetic sensor data Mx, My, Mz. The sense data of the 9-axis sensor can include, but is not limited to: step counting data, single-click or double-click operation data. The smart mobile terminal performs algorithmic processing and analysis on the above motion data based on the local GPS data, calculates the user's motion indexes, and analyzes the motion indexes to obtain the user's motion state.

Optionally, in other embodiments of the present disclosure, the method further includes the following steps:
the smart mobile terminal sending a sound pickup direction control command to the smart glasses when detecting the sound pickup direction selection operation performed by the user in the preset client application, wherein the sound pickup direction control command includes the target direction indicated by the sound pickup direction selection operation; and
the smart glasses receiving the sound pickup direction control command; if the target direction is forward, then in the hearing aid mode, performing a second beamforming processing on the voice data so that the sound beam pickup of the at least one sound pickup device is directed forward; if the target direction is omnidirectional, then in the hearing aid mode, the second beamforming processing is not performed on the voice data, so that the sound beam pickup of the at least one sound pickup device is directed omnidirectionally.

Based on the above steps, the user can control the sound pickup direction of the smart glasses in the hearing aid mode through the APP in the smart mobile terminal. For example, the user can select the sound beam of the smart glasses to direct forward or 360° omnidirectionally through the APP, which can improve the convenience and flexibility of the sound pickup direction control of the smart glasses.

Optionally, in other embodiments of the present disclosure, the method further includes the following steps:
the smart mobile terminal sending a volume adjustment control command to the smart glasses when detecting the volume adjustment operation performed by the user in the preset client application, wherein the volume adjustment control command includes the target speaker, target frequency band, and target volume indicated by the volume adjustment operation; and
the smart glasses receiving the volume adjustment control command and adjusting the sound data output by the target speaker to the sound data of the target frequency band and target volume by using the voice equalizer.

Based on the above steps, the user can adjust and control the speakers of the smart glasses, the frequency band and the volume of the played sound through the APP in the smart mobile terminal. For example, the user can select one or more or all speakers of the smart glasses through the APP and adjust the frequency band of the played sound data to the required frequency band, and increase or decrease the volume of the sound data, thereby improving the convenience and flexibility of sound playback control of the smart glasses.

In this embodiment, the wireless communication module installed on the smart glasses is configured to control and switch the operation modes of the smart glasses based on the user's control operation. On the one hand, the wireless communication module performs a first beamforming processing on the voice data acquired by the sound pickup device in the call mode, so that the sound beam pickup of the sound pickup device is directed downward. On the other hand, the wireless communication module performs a second beamforming processing on the voice data in the hearing aid mode, so that the sound beam pickup of the sound pickup device is directed forward, thereby implementing the telephone call function and the hearing aid function based on the same hardware platform of the smart glasses, increasing the functions of the smart glasses. In addition, since there is no need to install additional hearing aid device on the smart glasses, the weight of the smart glasses can be reduced, power consumption can be reduced, and the manufacturing cost of the smart glasses can be reduced.

It should be understood that in the above-described embodiments of the present disclosure, the above-mentioned smart glasses, systems, and methods can be implemented in other manners. For example, multiple modules or components may be combined or be integrated into another system, or some of the features may be ignored or not performed. In addition, the above-mentioned mutual coupling may be direct coupling or communication connection, and may also be indirect coupling or communication connection through some interfaces, and may also be electrical, mechanical or in other forms.

It should be noted that for the various method embodiments described above, for the sake of simplicity, they are described as a series of combined actions. However, those skilled in the art should understand that the present disclosure is not limited by the order of the described actions, as certain steps can be performed in a different order or simultaneously. Additionally, it should be understood that the embodiments described in the present disclosure are preferred embodiments, and the actions and modules involved are not necessarily required for the present disclosure.

In the above embodiments, the descriptions of the embodiments have different focuses. For portions not described in a particular embodiment, reference can be made to relevant descriptions in other embodiments.

The above is a description of the smart glasses, control methods, and control systems according to the present disclosure. Those skilled in the art should understand that based on the embodiments of the present disclosure, there may be changes in specific implementations and application scopes. Therefore, the content of this specification should not be construed as limiting the present invention.

The invention claimed is:

1. Smart glasses, comprising a frame, a plurality of temples, at least one sound pickup device and a wireless communication module;
   wherein the temples are connected to the frame, the at least one sound pickup device is provided on at least one of the plurality of temples, and the wireless communication module is provided in a cavity of any one of the plurality of temples and electrically connected to the at least one sound pickup device; and
   wherein the wireless communication module is configured to control and switch operation modes of the smart glasses, and the operation modes comprise a call mode and a hearing aid mode;
   the wireless communication module is further configured to perform a first beamforming processing on voice data acquired by the at least one sound pickup device in the call mode, so that sound beam pickup of the at least one sound pickup device is directed downward; and
   the wireless communication module is further configured to perform a second beamforming processing on the voice data in the hearing aid mode, so that the sound beam pickup of the at least one sound pickup device is directed forward.

2. The smart glasses according to claim 1, wherein the plurality of temples comprises a first temple and a second temple, and wherein a front end of the first temple and a front end of the second temple are respectively connected with two sides of the frame, and the at least one sound pickup device is installed on the front end of the first temple.

3. The smart glasses according to claim 2, wherein the smart glasses further comprise a first speaker and a second speaker that are electrically connected to the wireless communication module; and
wherein the first speaker is installed on the first temple, and an output of the first speaker is located at a rear end of the first temple; and
the second speaker is installed on the second temple, and an output of the second speaker is located at a rear end of the second temple.

4. The smart glasses according to claim 3, wherein the wireless communication module comprises a controller, a voice data processor and a wireless signal transceiver; and
wherein the controller is configured to control and switch the operation modes of the smart glasses;
the voice data processor is configured to process the voice data; and
the wireless signal transceiver is configured for data interaction with a smart mobile terminal.

5. The smart glasses according to claim 4, wherein the first speaker and the second speaker are mono speakers;
the controller is a microcontroller unit;
the voice data processor is a digital signal processor or an integrated circuit for voice data processing; and
the wireless signal transceiver uses at least one of Bluetooth protocol, Wireless Fidelity protocol, Near Field Communication protocol, ZigBee protocol, Digital Living Network Alliance protocol, Ultra Wideband protocol, Radio Frequency Identification protocol and Cellular Mobile Communication protocol as a communication protocol for data interaction with the smart mobile terminal.

6. The smart glasses according to claim 4, wherein the voice data processor is further configured to perform voice equalization processing and output volume control processing on data of a downlink channel in the call mode, and perform echo cancellation processing, the first beamforming processing and noise cancellation processing on data of an uplink channel.

7. The smart glasses according to claim 6, wherein,
the voice data processor is further configured to perform the voice equalization processing and the output volume control processing on call voice data received by the wireless signal transceiver from the smart mobile terminal in the call mode, and send the call voice data after the output volume control processing to the first speaker and the second speaker for output; and
the voice data processor is further configured to perform echo cancellation processing on the voice data with the call voice data after the output volume control processing as a reference signal, perform the first beamforming processing and noise cancellation processing on the voice data after the echo cancellation processing, and send the voice data after the noise cancellation processing to the smart mobile terminal through the wireless signal transceiver.

8. The smart glasses according to claim 4, wherein,
the voice data processor is further configured to perform feedback cancellation processing, the second beamforming processing, noise cancellation processing, voice equalization processing, and user talking detection processing on the voice data in the hearing aid mode, and send the voice data after the voice equalization processing to the first speaker and the second speaker for output, wherein the voice data after the voice equalization processing is also used as reference data for the feedback cancellation processing.

9. The smart glasses according to claim 4, wherein the smart glasses further comprise at least one sensor electrically connected to the wireless communication module; and
the at least one sensor is installed on an inside and/or an outside of the first temple and/or the second temple.

10. The smart glasses according to claim 9, wherein the at least one sensor comprises: at least one touch sensor, at least one proximity sensor, an accelerometer, a gyroscope, a magnetic sensor, or an inertial measurement unit; and
wherein the at least one touch sensor is installed on an outside of the first temple and/or the second temple.

11. The smart glasses according to claim 10, wherein,
the at least one touch sensor is configured to detect a user's first control operation, and the first control operation is intended to adjust volume; and
the controller is further configured to control and adjust the volume in response to the first control operation.

12. The smart glasses according to claim 11, wherein the first control operation comprises a control operation for turning up the volume and a control operation for turning down the volume; and
wherein the control operation for turning up the volume corresponds to an action of the user's finger sweeping toward the user's ear on the touch sensor, and the control operation for turning down the volume corresponds to an action of the user's finger sweeping toward the frame on the touch sensor.

13. The smart glasses according to claim 10, wherein the at least one touch sensor is configured to detect the user's second control operation; and
the controller is further configured to control and switch the operation modes of the smart glasses in response to the second control operation;
wherein the second control operation corresponds to the user's action of clicking or long-pressing the touch sensor.

14. The smart glasses according to claim 10, wherein the at least one proximity sensor is installed on the inside of the first temple and/or the second temple;
the at least one proximity sensor is configured to detect whether a user wears or takes off the smart glasses and obtain a length of time when the user has not worn the smart glasses, and send a detected result to the controller; and
the controller is configured to, according to the detected result, play music data when the proximity sensor detects that the user wears the smart glasses, stop playing the music data when the proximity sensor detects that the user takes off the smart glasses, and perform a shutdown operation when the proximity sensor detects that the user has not worn the smart glasses for more than a preset period of time.

15. The smart glasses according to claim 9, wherein the controller is further configured to send data obtained by the at least one sensor to the smart mobile terminal through the wireless signal transceiver.

16. The smart glasses according to claim 1, wherein the sound pickup device is a microphone array, and the microphone array comprises at least two microphones.

17. The smart glasses according to claim 16, wherein the microphone array comprises a first microphone, a second microphone and a third microphone; and wherein a distance between the third microphone and the first microphone is equal to a distance between the third microphone and the second microphone;
wherein the smart glasses are provided with one said microphone array, the first microphone, the second microphone and the third microphone are all installed on the same temple, and the first microphone and the second microphone are closer to the frame than the third microphone;
the controller is configured to control the first microphone and the second microphone to obtain the voice data in the call mode; and
the controller is further configured to control the first microphone, the second microphone and the third microphone to obtain the voice data in the hearing aid mode.

18. The smart glasses according to claim 2, wherein the smart glasses further comprise a battery, and the battery is installed on the first temple and is electrically connected to the wireless communication module;
wherein the smart glasses further comprise at least one hearing aid, and the at least one hearing aid is installed on the first temple and/or the second temple and electrically connected to the wireless communication module; and
the wireless communication module is further configured to control the at least one hearing aid to output the voice data in the hearing aid mode;
wherein the smart glasses further comprise at least one control button, and the at least one control button is installed on an outside of the first temple and/or the second temple and is electrically connected to the wireless communication module;
the at least one control button is configured to trigger the wireless communication module to control and switch the operation modes or running states of the smart glasses; and
the running states comprise an idle state and a working state, and the working state comprises the call mode and the hearing aid mode.

19. The smart glasses according to claim 1, wherein,
the wireless communication module is further configured to receive a sound pickup direction control command sent by a smart mobile terminal;
the wireless communication module is further configured to perform the second beamforming processing on the voice data in the hearing aid mode when a direction indicated by the sound pickup direction control command is forward, so that the sound beam pickup of the at least one sound pickup device is directed forward; and
the wireless communication module is further configured to not perform the second beamforming processing on the voice data in the hearing aid mode when the direction indicated by the sound pickup direction control command is omnidirectional, so that the sound beam pickup of the at least one sound pickup device is directed omnidirectionally.

20. The smart glasses according to claim 5, wherein the voice data processor comprises a voice equalizer;
the wireless signal transceiver is configured to receive a volume adjustment control command sent by the smart mobile terminal and send the same to the voice data processor; and
the voice data processor is configured to adjust voice data to be output to voice data of a frequency band and volume directed by the volume adjustment control command by using the voice equalizer, and send the adjusted voice data to the corresponding speaker directed by the volume adjustment control command.

21. A smart glasses control system, comprising a smart mobile terminal and the smart glasses claim 1; and
the smart mobile terminal is configured for data interaction with the smart glasses.

22. The smart glasses control system according to claim 21, further comprising a cloud smart device; and
the cloud smart device is configured to store data sent by the smart mobile terminal and process the data based on a preset processing logic.

23. The smart glasses control system according to claim 21, wherein the smart mobile terminal is further configured for pairing with the smart glasses based on a Bluetooth protocol, and after a successful pairing, sending played music data to the smart glasses for play;
wherein the smart mobile terminal is further configured to obtain GPS data through a local Global Positioning System (GPS) module and send the GPS data to the smart glasses for positioning of the smart glasses;
wherein the smart mobile terminal is further configured to receive and store motion data sent by the smart glasses in real time, calculate motion indexes according to the motion data and the GPS data, generate real-time voice data for notifying or reminding a user of the user's motion state based on calculated results, and send the real-time voice data to the smart glasses for output; and
wherein the motion data comprises data obtained by the smart glasses through a 9-axis sensor, and the motion indexes are running indexes which comprise pace, distance, step count, left and right balance of head, step distance and step frequency; and
the smart mobile terminal is further configured to perform index calculation, posture monitoring and motion reminder operations based on the motion data and the GPS data, and display calculated index results in real time through a display of the smart mobile terminal.

24. The smart glasses control system according to claim 21, wherein the smart mobile terminal is further configured to perform an operation of making, answering or hanging up a call in response to a voice command sent by the smart glasses, and send call voice data to the smart glasses during the call;
the smart mobile terminal is further configured to send a sound pickup direction control command to the smart glasses according to a user's sound pickup direction selection operation; and
the smart mobile terminal is further configured to send a volume adjustment control command to the smart glasses according to the user's volume adjustment operation.

25. A control method of smart glasses, wherein the smart glasses comprise a wireless communication module and a sound pickup device electrically connected to the wireless communication module, and the method comprises steps of:
controlling and switching an operation mode of the smart glasses to a call mode or a hearing aid mode through the wireless communication module in response to a user's control operation;
obtaining voice data through the sound pickup device;
performing a first beamforming processing on the voice data through the wireless communication module if a current operation mode of the smart glasses is the call mode, so that a sound beam pickup of the sound pickup device is directed downward; and performing a second beamforming processing on the voice data through the wireless communication module if the current operation mode of the smart glasses is the hearing aid mode, so that the sound beam pickup of the sound pickup device is directed forward.

26. The method according to claim 25, wherein the smart glasses further comprise a speaker electrically connected to the wireless communication module, and the method further comprises:
performing feedback cancellation processing, noise cancellation processing, voice equalization processing and user talking detection processing on the voice data through the wireless communication module in the hearing aid mode, and sending the voice data after the voice equalization processing to the speaker for output, with the voice data after the voice equalization processing as reference data for the feedback cancellation processing.

27. The method according to claim 25, wherein the smart glasses further comprise a speaker electrically connected to the wireless communication module, and the method further comprises:
performing voice equalization processing and output volume control processing on call voice data from a smart mobile terminal through the wireless communication module in the call mode, and sending the call voice data after the output volume control processing to the speaker for output;
performing echo cancellation processing on the voice data through the wireless communication module with the call voice data after the output volume control processing as a reference signal; and
performing noise cancellation processing on the voice data through the wireless communication module, and sending voice data after the noise cancellation processing to the smart mobile terminal.

28. The method according to claim 27, wherein before obtaining the voice data through the sound pickup device, the method further comprises:
performing Bluetooth pairing with the smart mobile terminal through the wireless communication module based on a Bluetooth protocol to establish a data transmission channel between the smart glasses and the smart mobile terminal;
wherein the smart glasses further comprise a touch sensor electrically connected to the wireless communication module, and the method further comprises:
detecting the user's first control operation through the touch sensor; and
controlling and adjusting volume of sound output by the smart glasses through the wireless communication module in response to the first control operation when the first control operation is detected by the touch sensor;
wherein the first control operation comprises a control operation for turning up the volume and a control operation for turning down the volume; and
the control operation for turning up the volume corresponds to an action of the user's finger sweeping toward the user's ear on the touch sensor, and the control operation for turning down the volume corresponds to an action of the user's finger sweeping toward a frame of the smart glasses on the touch sensor.

29. The method according to claim 25, wherein the smart glasses further comprise a touch sensor electrically connected to the wireless communication module, and the step of controlling and switching the operation mode of the smart glasses to the call mode or the hearing aid mode through the wireless communication module in response to the user's control operation comprises:
detecting the user's second control operation through the touch sensor, wherein the second control operation corresponds to the user's action of long pressing the touch sensor; and
controlling and switching the operation mode to the call mode or the hearing aid mode through the wireless communication module in response to the second control operation when the second control operation is detected by the touch sensor; or
the smart glasses further comprise a control button electrically connected to the wireless communication module, and the step of controlling and switching the operation mode of the smart glasses to the call mode or the hearing aid mode through the wireless communication module in response to the user's control operation comprises:
controlling and switching the operation mode to the call mode or the hearing aid mode through the wireless communication module in response to a click operation when such operation of the user clicking the control button is detected.

30. The method according to claim 25, wherein the smart glasses further comprise a speaker and a proximity sensor electrically connected to the wireless communication module, and the proximity sensor is installed on an inside of a temple of the smart glasses, and the method further comprises:
detecting whether the user wears or takes off the smart glasses through the proximity sensor;
controlling the speaker to play audio data through the wireless communication module when the proximity sensor detects that the user wears the smart glasses; and
controlling the speaker to stop playing the audio data through the wireless communication module when the proximity sensor detects that the user takes off the smart glasses, and performing a shutdown operation through the wireless communication module when the proximity sensor detects that the user has taken off the smart glasses for more than a preset period of time;
wherein the audio data comprises any one of the following data:
unplayed music data of the smart glasses when the user took off the smart glasses last time;
default music data stored in a built-in memory of the smart glasses; and
music data or call voice data received from a smart mobile terminal through the wireless communication module when the user wears the smart glasses.

31. The method according to claim 27, wherein before performing the first beamforming processing on the voice data through the wireless communication module, the method further comprises:
performing voice recognition on the voice data through the wireless communication module, and sending a recognized voice command to the smart mobile terminal;
performing an operation directed by the voice command through the smart mobile terminal in response to the voice command, wherein the operation directed by the voice command comprises any one of making a call, answering a call, and hanging up a call; and
sending received call voice data to the smart glasses through the smart mobile terminal when the operation directed by the voice command is to make or answer a call, to output the call voice data through the speaker of the smart glasses;

wherein the smart glasses further comprise a motion sensor electrically connected to the wireless communication module, and the method further comprises:

obtaining motion data through the motion sensor, and sending the motion data to a smart mobile terminal in real time through the wireless communication module; and receiving and storing the motion data in real time through the smart mobile terminal, calculating motion indexes based on the motion data and Global Positioning System (GPS) data, generating real-time voice data for notifying or reminding the user of the user's motion state based on calculated results, and sending the real-time voice data to the smart glasses to output the real-time voice data through a speaker of the smart glasses;

wherein the GPS data is obtained through a GPS module of the smart mobile terminal;

the motion sensor is a 9-axis sensor, and the motion indexes are running indexes which comprise pace, distance, step count, left and right balance of head, step distance and step frequency; and the method further comprises:

performing index calculation, posture monitoring and motion reminder operations through the smart mobile terminal based on the motion data and the GPS data, and displaying calculated index results in real time through a display of the smart mobile terminal.

32. The method according to claim 25, wherein running states of the smart glasses comprise an idle state and a working state, and the working state comprises the call mode and the hearing aid mode, and the method further comprises:

in the idle state, when a call event is detected, controlling the smart glasses to enter the call mode through the wireless communication module, and in the call mode, when a hang-up event is detected, controlling the smart glasses to return to the idle state;

in the hearing aid mode, when the call event is detected, controlling the smart glasses to enter the call mode through the wireless communication module, and in the call mode, when the hang-up event is detected, controlling the smart glasses to return to the hearing aid mode; and in the idle state, when a key event is detected, controlling the smart glasses to enter the hearing aid mode through the wireless communication module, and in the hearing aid mode, when the key event is detected again, controlling the smart glasses to return to the idle state.

33. The method according to claim 25, wherein the sound pickup device is a microphone array composed of a first microphone, a second microphone and a third microphone, the first microphone and the second microphone are closer to a frame of the smart glasses than the third microphone, and a distance between the first microphone and the third microphone is equal to a distance between the second microphone and the third microphone, and wherein the step of obtaining voice data through the sound pickup device comprises:

after controlling and switching the operation mode of the smart glasses to the call mode, controlling the first microphone and the second microphone to obtain the user's voice data through the wireless communication module; and after controlling and switching the operation mode of the smart glasses to the hearing aid mode, controlling the first microphone, the second microphone and the third microphone to obtain the user's conversation partner's voice data through the wireless communication module.

* * * * *